United States Patent
Rentzelos et al.

(10) Patent No.: US 12,404,862 B2
(45) Date of Patent: Sep. 2, 2025

(54) CONTAINMENT FOR FLUID HANDLING DEVICES, SUCH AS PUMPS, AND RELATED DEVICES, APPARATUS, SYSTEMS, AND METHODS

(71) Applicant: FLOWSERVE PTE. LTD.

(72) Inventors: Nick Rentzelos, Northbrook, IL (US); Stephen Ide, Nazareth, PA (US); Collin Perle, Plainfield, IL (US)

(73) Assignee: Flowserve Pte. Ltd., Singapore (SG)

( * ) Notice: Subject to any disclaimer, the term of this patent is extended or adjusted under 35 U.S.C. 154(b) by 0 days.

(21) Appl. No.: 18/140,597

(22) Filed: Apr. 27, 2023

(65) Prior Publication Data

US 2024/0360833 A1 Oct. 31, 2024

(51) Int. Cl.
*F04D 25/02* (2006.01)

(52) U.S. Cl.
CPC .................................. *F04D 25/026* (2013.01)

(58) Field of Classification Search
CPC .................................................... F04D 25/026
See application file for complete search history.

(56) References Cited

U.S. PATENT DOCUMENTS

| | | | |
|---|---|---|---|
| 4,722,664 A * | 2/1988 | Wissman | F04D 29/026 415/197 |
| 5,525,039 A | 6/1996 | Sieghartner | |
| 5,856,719 A | 1/1999 | De Armas | |
| 6,135,728 A | 10/2000 | Klein | |
| 6,234,748 B1 | 5/2001 | Brown | |
| 6,264,440 B1 * | 7/2001 | Klein | F04D 29/047 417/365 |
| 6,293,772 B1 | 9/2001 | Brown | |
| 6,997,688 B1 * | 2/2006 | Klein | F04D 29/126 417/420 |
| 7,572,115 B2 | 8/2009 | Klein | |
| 7,707,720 B2 | 5/2010 | Klein | |
| 8,770,945 B2 | 7/2014 | Ozaki | |
| 9,133,847 B2 | 9/2015 | Hijikata | |
| 9,592,326 B2 | 3/2017 | Takatani | |
| 10,036,389 B2 | 7/2018 | Li | |
| 10,428,822 B1 | 10/2019 | Wang | |

(Continued)

FOREIGN PATENT DOCUMENTS

| | | |
|---|---|---|
| CN | 111089060 A | 5/2020 |
| CN | 212028076 | 11/2020 |

(Continued)

OTHER PUBLICATIONS

International Search Report and Written Opinion for PCTIB2024054008, Jul. 23, 2024, 10 pages.

*Primary Examiner* — Connor J Tremarche
(74) *Attorney, Agent, or Firm* — BKRIP LLC (57) ABSTRACT

Intermediate drives may provide containment for fluid handling devices, such as pumps. Such intermediate drivees may one or more utilize magnetic drives to provide static barriers for mechanical devices. A fluid handling assembly may include a fluid handling device comprising a housing, a housing cavity, a fluid inlet, and a fluid outlet. An intermediate drive may be positioned and configured to transmit energy from a motor to the fluid handling device while providing a secondary containment area that is separate from the primary containment area provided by the fluid handling device.

19 Claims, 4 Drawing Sheets

(56) References Cited

U.S. PATENT DOCUMENTS

| | | | |
|---|---|---|---|
| 10,704,810 B2 | 7/2020 | Snell | |
| 10,830,240 B2 | 11/2020 | Eschner | |
| 2004/0013546 A1 | 1/2004 | Klein | |
| 2007/0110595 A1* | 5/2007 | Sato | F04D 13/0633 417/423.12 |
| 2015/0270768 A1* | 9/2015 | Sinnerud | F03B 11/006 310/104 |
| 2021/0246901 A1 | 8/2021 | Eschner | |
| 2022/0178381 A1* | 6/2022 | De Raeve | F04D 1/06 |

FOREIGN PATENT DOCUMENTS

| | | |
|---|---|---|
| IT | PD20120320 A1 | 4/2014 |
| JP | S62267591 A | 11/1987 |

\* cited by examiner

CONTAINMENT FOR FLUID HANDLING DEVICES, SUCH AS PUMPS, AND RELATED DEVICES, APPARATUS, SYSTEMS, AND METHODS

TECHNICAL FIELD

The present disclosure relates generally to containment assemblies and systems for mechanical or fluid handling devices, such as pumps, and, more particularly, to intermediate drives providing containment (e.g., secondary containment) utilizing one or more magnetic drives to provide static barriers for fluid handling devices that, for example, may be utilized with hazardous fluids and related assemblies, systems, and methods.

BACKGROUND

Magnetic-drive centrifugal pumps may be used to pump fluids, such as caustic and/or hazardous liquids and/or gases. A magnetic-drive pump features a pump shaft separated from a drive shaft by a containment shell. The drive shaft is arranged to rotate with one magnetic assembly, which is magnetically coupled to another magnetic assembly. The magnetic assemblies cooperate to apply torque to the pump shaft or an impeller to pump a fluid contained by the containment shell.

Although many magnetic-drive centrifugal pumps are generally reliable, the containment shell may leak or burst from the presence of one or more of the following factors: exposure to excessive heat, exposure to excessive hydraulic pressure, exposure to extreme hydraulic transients, long-term exposure to caustic or corrosive fluids, lack of proper pump maintenance, exposure to excessive particulate matter, and/or exceeding other operating limitations of the pump. If the pumped fluid is caustic or corrosive, the pumped fluid may erode the interior of the containment shell such that the integrity of the containment shell is degraded over time. If the pump is not properly maintained, excessive radial bearing wear may lead to rubbing or scraping mechanical contact between the impeller and the containment shell that damages the fluid containing capacity of the containment shell. Further, if particles in the pumped fluid accumulate or lodge between the containment shell and the impeller, the containment shell may become scratched, eroded or pitted; and hence, more vulnerable to chemical attack from the pumped fluid.

Leakage of the pumped fluid from an improperly maintained, misused or abused pump may be associated with health and safety risks because the pumped fluid may be hazardous, caustic, flammable, or toxic, for instance.

BRIEF SUMMARY

In some aspects, the techniques described herein relate to a pump assembly including: a pump including a pump housing, a housing cavity, a fluid inlet, and a fluid outlet, the pump defining a primary containment area; an intermediate drive positioned and configured to transmit energy from a motor to the pump, the intermediate drive defining a secondary containment area separate from the primary containment area; a non-metallic first static barrier providing a static seal between the housing cavity of the pump and the secondary containment area; a non-metallic second static barrier providing a static seal between the secondary containment area and a surrounding environment; a first magnetic drive for providing a magnetic coupling across the first static barrier; and a second magnetic drive for providing a magnetic coupling across the second static barrier.

In some aspects, the techniques described herein relate to a fluid handling assembly including: a fluid handling device including a housing defining a housing cavity, a fluid inlet, and a fluid outlet, the fluid handling device defining a primary containment area; and an intermediate drive positioned and configured to transmit energy from a motor to the fluid handling device, the intermediate drive defining a secondary containment area separate from the primary containment area, the intermediate drive including: a modular housing including a drive end housing, an output end housing, and a central housing; a coupling to the fluid handling device positioned at the output end housing; a static barrier positioned at the drive end housing providing a static seal between the secondary containment area and a surrounding environment; a magnetic drive for providing a magnetic coupling with the motor across the static barrier positioned at the drive end housing; and a drive shaft coupled between the magnetic drive and the coupling to the fluid handling device, the central housing for supporting and positioning the drive shaft in the central housing with one or more bearings.

In some aspects, the techniques described herein relate to an intermediate drive including: a drive housing having a first end portion configured to couple to a fluid handling device and a second end portion configured to couple to a motor; a static barrier coupled to the drive housing and defining a containment area within the drive housing that is sealed with one or more static seals separating the containment area from a surrounding environment when the drive housing is coupled to a fluid handling device; a rotor including magnets positioned adjacent to the static barrier of the intermediate drive to be driven by the motor; a drive coupling mechanically coupled to the rotor, the drive coupling configured to apply force supplied by the motor via the intermediate drive to the fluid handling device; a drive shaft coupled between the rotor and the drive coupling; and a cartridge positioned in the drive housing for supporting and positioning the drive shaft in the drive housing with one or more bearings.

In some aspects, the techniques described herein relate to an intermediate drive including: a drive housing having a first end configured to couple to a fluid handling device and a second end configured to couple to a motor; a static barrier coupled to the drive housing and defining a containment area within the drive housing that is sealed with one or more static seals separating the containment area from a surrounding environment when the drive housing is coupled to a fluid handling device; and a drive assembly including: a rotor positioned on a first end of the drive assembly, the rotor including magnets positioned adjacent to the static barrier of the intermediate drive to be driven by the motor; and a drive coupling coupled to the rotor and positioned on a first end of the rotor assembly, the drive coupling configured to apply force supplied by the motor via the intermediate drive to the fluid handling device, wherein the intermediate drive supports the drive assembly using only a single bearing or wherein the intermediate drive supports the drive assembly without the use of bearings.

In some aspects, the techniques described herein relate to a method of driving a fluid handling device with an intermediate drive including a statically sealed secondary containment area, the method including: indirectly driving a first rotor of the intermediate drive via magnetic force applied through a first non-metallic static barrier, the first non-metallic static barrier being coupled to a drive housing of the intermediate drive and defining a secondary containment area within the drive housing that is sealed from a surrounding environment; transferring force applied to the first rotor to a second rotor; and indirectly driving the fluid handling device with the second rotor via magnetic force applied through a second non-metallic static barrier.

In some aspects, the techniques described herein relate to a pump assembly comprising: a pump comprising a pump housing, a housing cavity, a fluid inlet, and a fluid outlet; an intermediate drive positioned and configured to transmit energy from a motor to the pump, the secondary drive comprising a secondary containment area; a non-metallic primary static barrier providing a static seal between the housing cavity of the pump and the secondary containment area; a non-metallic secondary static barrier providing a static seal between the secondary containment area and a surrounding environment; a first magnetic drive providing a magnetic coupling across the primary static barrier; and a second magnetic drive providing a magnetic coupling across the secondary static barrier.

In some aspects, the techniques described herein relate to an intermediate drive comprising: a drive housing having a first end configured to couple to a pump and a second end configured to couple to a motor; a non-metallic static barrier coupled to the drive housing and defining a secondary containment area within the drive housing that is sealed completely with static seals separating the secondary containment area from a surrounding environment when the drive housing is coupled to a pump; a first rotor of a first magnetic drive comprising magnets positioned to fit adjacent a non-metallic static barrier of a pump; and a second rotor mechanically coupled to the first rotor, the second rotor comprising magnets positioned adjacent the non-metallic static barrier of the intermediate drive.

In some aspects, the techniques described herein relate to a method of providing a statically sealed secondary containment area for a mechanical device, the method comprising: providing an intermediate drive comprising: a drive housing having a first end configured to couple to the mechanical device and a second end configured to couple to a motor; a non-metallic static barrier coupled to the drive housing and defining a secondary containment area within the drive housing that is sealed completely with static seals separating the secondary containment area from a surrounding environment when the drive housing is coupled to the mechanical device; a first rotor of a first magnetic drive comprising magnets positioned to fit adjacent a non-metallic static barrier of the mechanical device; and a second rotor mechanically coupled to the first rotor, the second rotor comprising magnets positioned adjacent the non-metallic static barrier of the intermediate drive; and coupling the first end of the drive housing to the mechanical device.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

The illustrations presented herein are not meant to be actual views of any particular pump assembly, intermediate drive, or component thereof, but are merely idealized representations employed to describe illustrative embodiments. The drawings are not necessarily to scale. Elements common between figures may retain the same numerical designation.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the term "substantially." "approximately," or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

As used herein, the term "fluid" may mean and include fluids of any type and composition. Fluids may take a liquid form, a gaseous form, or combinations thereof, and, in some instances, may include some solid material (e.g., particulates, debris, etc.).

As discussed above, leakage of the pumped fluid from an improperly maintained, misused or abused pump may be associated with health and safety risks because the pumped fluid may be hazardous, caustic, flammable, or toxic, for instance. Even if the probability of a leak of containment shell is relatively low, a need exists for a secondary containment scheme for containing the pumped fluid in the event the containment shell leaks or bursts for any reason. Embodiments of the present disclosure may provide such containment that is secondary to one or more sealing features at a fluid handling device, such as, for example, a pump (e.g., that defines a primary containment).

Some embodiments of the present disclosure include a methods and apparatus for transmitting mechanical energy (e.g., force), rotationally and/or linearly, from an energy source (e.g., a motor) through a system of one or more magnetic drive couplings (e.g., one coupling, two couplings, three couplings, or more) to an energy consuming device (e.g., a mechanical or fluid handling device, such as, for example, a pump) through an intermediate drive structure or system. The intermediate drive may act to couple (e.g., and transfer one or more forces between) a first wet end of a system (e.g., a pump) with a dry end of the system (e.g., a motor) while providing additional sealing (e.g., a secondary seal) to a primary seal of the wet end of the pump (e.g., one or more seals on the pump). Such a configuration may provide additional isolation of the dry end (e.g., the motor and associate components and/or operators) from the wet end. For example, in the event of a breach in the primary containment area, the secondary containment may act to at least partially isolate (e.g., entirely isolate) the drive motor from exposure to the pumped fluid and/or gas.

While embodiments of the disclosure may be useful for many applications, it may be particularly useful in applications where a dangerous environment (e.g., hazardous fluids comprising liquids and/or gases) needs to be isolated from the atmosphere and/or a biological life sustaining environment and/or two separate mutually incompatible biological life sustaining environments.

Some embodiments may utilize two magnetic-drive couplings that may be arranged to transmit rotary motion, although linear motion is also disclosed. A first magnetic-drive coupling located at the energy consuming device may utilize a primary containment element (e.g., a shell including a non-metallic material) to isolate the dangerous atmosphere and allow the magnetic coupling to transmit motion through the sealed shell (e.g., to a component to be driven, such as, for example, a pump). A second magnetic-drive coupling located at the energy source may also utilize a containment element (e.g., another shell including a non-metallic material) to define a secondary containment area between the primary containment area of the dangerous environment and the isolated environment. The second magnetic-drive coupling also transmits motion from the energy source through the sealed shell to the primary magnetic drive. The two magnetic drives may be connected by intermediate mechanical componentry inside the secondary containment area to enable transmission of mechanical energy (e.g., force) from the energy source to the energy consuming device.

In some embodiments, the intermediate drive may include a magnetic coupling at the motor while being coupled (e.g., directly or indirectly coupled) to the pump or other energy consuming device (e.g., another fluid handling device, pressure exchanger, mixer, etc.). As above, the intermediate drive may include indirect magnetic coupling at either end. In additional embodiments, the intermediate drive may include an indirect magnetic coupling at the motor and a direct coupling at the pump or other energy consuming device (e.g., directly coupled to a shaft of the pump where the primary containment is achieved through one or more dynamic shaft seals).

In some embodiments, the magnetic coupling or couplings may assist in centering and/or self-aligning a drive shaft of the system.

In some embodiments, the primary and secondary containment elements may reduce or eliminate the need for dynamic sealing (e.g., shaft seals) in the components of the drive assembly and may enable to use of static seals (e.g., the use of only static seals) for at least partially isolating the intermediate drive from a surrounding environment. For example, the intermediate drive may not require shaft seals on an input side (e.g., dry side) of intermediate drive that interfaces with a motor or other drive device.

As discussed herein, the containment area or areas may refer to a portion, region, and/or volume of an element, assembly, device, and/or system that is at least partially isolated from an adjacent region and/or environment.

In some embodiments, the secondary containment area may be designed to have the same pressure and temperature parameters of the primary containment area, thus creating an intermediate isolated secondary containment chamber. This secondary containment chamber may be monitored for leakage of the dangerous atmosphere from the primary containment area. Accordingly, the monitoring system may be designed to warn operators of a leak from the primary containment area to the secondary containment area so that emergency action can be taken.

One example application of embodiments of the present disclosure is to drive a centrifugal chemical pump that may be utilized to pump various types of hazardous chemicals. Embodiments may also be utilized to drive other energy consuming devices, such as stirrers, reactors, propulsion systems, drive systems, compressors, and/or any system requiring separation of a hazardous environment from a surrounding environment. Embodiments may also be utilized to drive linear actuated devices such as valves and/or displacement pumps used in hazardous environments.

Some embodiments may utilize one or more sealed intermediate bearing, or no intermediate bearings, to allow transmission of energy between the input and output of the intermediate drive (e.g., between two magnetic drives). This may be advantageous as no ancillary heat exchange systems are needed to control internal temperatures of the mechanism.

In some embodiments, the intermediate drive may include one or more modular features that enable the intermediate drive to work with multiple types of upstream and/or downstream components (e.g., drives, pumps, exchangers, mixers, etc.). For example, the intermediate drive may include multiple housing components that can be interchanged and/or removed to interface with different componentry. Further, internal components of the intermediate drive be interchanged and/or removed depending on the desired application.

In some embodiments, the intermediate drive may be used as a retrofit to an existing system. For example, the intermediate drive may be used as a field retrofittable secondary containment upgrade. When implemented in an retrofit for a fluid handling device, such as a pump, the retrofit may not require opening the wetted areas of the pump casing and exposing the pumped fluid to atmosphere.

Figure 1:
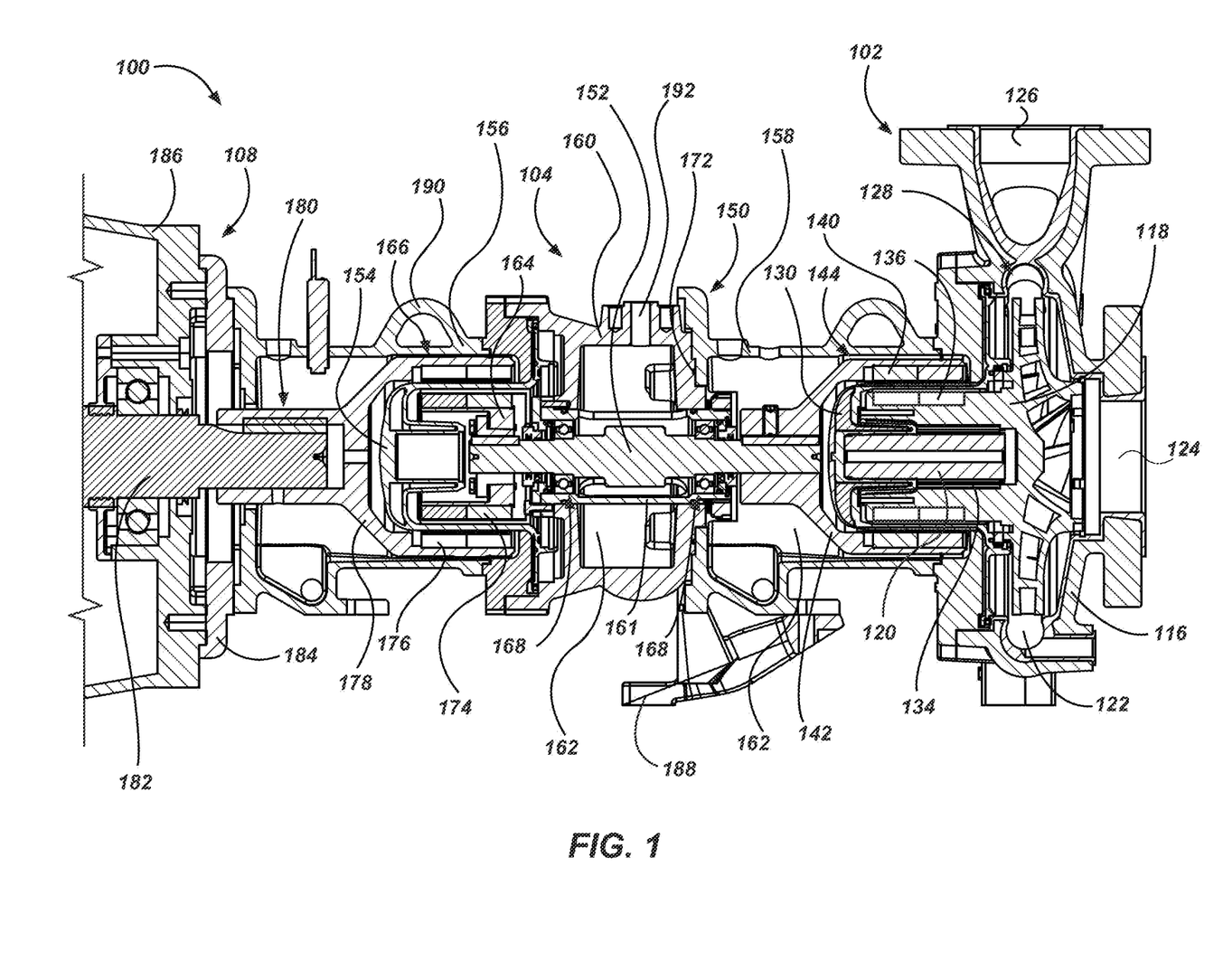
FIG. 1 is a cross-sectional view of a centrifugal pump assembly with a magnetically-driven centrifugal pump and a magnetically-driven intermediate drive providing secondary containment for the centrifugal pump coupled to a motor, according to an embodiment of the present disclosure.

FIG. 1 illustrates a cross-sectional view of a centrifugal pump assembly 100 with a magnetically-driven centrifugal pump 102 and a magnetically-driven intermediate drive 104 providing secondary containment for the centrifugal pump 102 coupled to a motor 108, according to an embodiment of the present disclosure. As above, in additional embodiments, the pump 102 may be driven by other components, such as, for example, a dynamically sealed shaft.

The centrifugal pump 102 may include a pump housing 116, an impeller 118 (e.g., comprising a composite plastic, such as a fiber reinforced polymer), and a pump shaft 120. The pump housing 116 may include a housing cavity 122 having a fluid inlet 124, and a fluid outlet 126. The pump housing 116 may be comprised of a plurality of sections that may be cast, molded, and/or otherwise formed and connected together with fasteners and/or adhesives. The pump housing 116, one or more portions of which provides a barrier for a primary containment area 128 (e.g., wetted areas), may be formed from a corrosion-resistant material (e.g., a stainless steel, a polymer, a fiber-reinforced polymer, a composite, a ceramic, and/or a reinforced ceramic), and/or the housing cavity 122 may be lined with a corrosion-resistant material (e.g., a fluoropolymer coating, such as, for example, ethylene tetrafluoroethylene (ETFE) or another polymer coating).

One end of the pump shaft 120 may be coupled to a primary static barrier 130, which may be formed of a non-metallic material, that provides a static seal of the housing cavity 122 at one end of the pump housing 116. Such non-metallic material for the primary static barrier 130 (or other such barriers discussed herein) may include, for example, a reinforced polymer and/or ceramic (e.g., fiber reinforced), a composite material, a polymer, a ceramic, combinations thereof, etc.

An annular portion of the impeller 118 may be positioned over the pump shaft 120 and radial bearings 134 may be positioned between the annular portion of the impeller 118 and the pump shaft 120 to facilitate the rotation of the impeller 118 about the pump shaft 120. The pump shaft 120 may be coupled to the intermediate drive 104 via an indirect or direct coupling (e.g., via a magnetic coupling or via a direct mechanical coupling to the pump shaft 120). For example, the annular portion of the impeller 118 may include one or more magnets 136 (e.g., encapsulated magnets) at a location proximate to a first side of the primary static barrier 130 positioned and configured to interact with one or more corresponding magnet 140 (e.g., encapsulated magnets) of a rotor 142 of a first magnetic drive 144 of the intermediate drive 104, the magnets 140 being located proximate to an opposing second side of the primary static barrier 130 the intermediate drive 104 is coupled to the centrifugal pump 102.

In additional embodiments that include a direct coupling, the drive shaft 152 may be directly coupled to the pump shaft 120 (e.g., where one or more of the drive shaft 152 and/or the pump shaft 120 may include a dynamic seal).

The intermediate drive 104 may include a drive housing 150, a drive shaft 152, and a secondary static barrier 154. As above, the secondary static barrier 154 may comprise a non-metallic material may include, for example, a reinforced polymer and/or ceramic (e.g., fiber reinforced), a composite material, a polymer, a ceramic, combinations thereof, etc.

The drive housing 150 may be comprised of a number of sections including an input end housing 156, an output end housing 158, and a central housing 160 that may be cast, molded, and/or otherwise formed and connected together with fasteners and/or adhesives. At least the output end housing 158 and the central housing 160 of the drive housing 150, which provide a barrier for a secondary containment area 162, may be formed from a corrosion-resistant material, and/or may be lined with a corrosion-resistant material.

As above, the various components of the drive housing 150 may be modular (e.g., replaceable, interchangeable, removable) to accommodate use with a range of different input and/or output components. For example, one or more of the input end housing 156, the output end housing 158, and/or the central housing 160 may be interchanged and/or removed to accommodate different size and/or configurations of an output component (e.g., the pump 102) and/or an input component (e.g., the motor 108).

In some embodiments, the central housing 160 may include modular components (e.g., cartridge 161) that interface with the shaft 152 extending through the central housing 150. For example, the cartridge 161 may support and position one or more radial bearings 168 that support the shaft 152. In embodiments where open bearings are used, the cartridge 161 may enable the supply of lubricating fluid to the bearings 168 (e.g., through openings formed in lateral or radial sides of the cartridge 161).

In embodiments where a reduced number of bearings are implemented or omitted (e.g., such as those discussed below), the cartridge 161 and/or the entire central housing 150 may be removed. For example, as depicted in FIG. 1, the central housing 160 may house the one or more radial bearings 168 (e.g., along with the cartridge 161, when implemented) to support a central portion of the drive shaft 152 as the drive shaft 152 extends between the input end housing 156 and the output end housing 158. In additional embodiments, such as those discussed below with reference to FIGS. 3 and 4, the central housing 160 may be omitted where one or more bearings are posited at an interface between the input end housing 156 and the output end housing 158 or where bearings and a drive shaft are entirely omitted.

The drive shaft 152 may have an output end mechanically coupled with the rotor 142 of the first magnetic drive 144 and an opposing input end mechanically coupled with a first rotor 164 of a second magnetic drive 166. For example, the rotor 142 of the first magnetic drive 144 and the first rotor 164 of the second magnetic drive 166 may each include a keyed connected along with a mechanical coupling (e.g., a set screw, a flanged or tapered connection, etc.).

The one or more radial bearings 168 may be positioned between the drive housing 150 and the drive shaft 152 to secure the drive shaft 152 and facilitate the rotation of the drive shaft 152 relative to the drive housing 150. In some embodiments, one or more rotary shaft seals may also be located between the drive shaft 152 and the drive housing 150 which may provide a dynamic seal between regions of the drive housing 150, such as, for example, between the output end housing 158 and the central housing 160 and between the central housing 160 and the input end housing 156.

In some embodiments, each radial bearing 168 may be an open bearing, as shown in FIG. 1. Accordingly, a cavity of the central housing 160 may include a fluid (e.g., an oil bath), which may lubricate and cool each radial bearing 168. The rotary shaft seals may prevent oil from leaking from the central housing 160 into the input end housing 156 and the output end housing 158. In additional embodiments, sealed radial bearings may be utilized, as will be discussed further herein with reference to FIGS. 2 and 3.

In some embodiments, one or more of the housings 156, 158, 160 may hold a fluid (e.g., oil) for cooling portions of the drive system.

As shown in FIG. 1, the output end housing 158 may be coupled to the pump housing 116 such that the primary static barrier 130 provides a static seal between the housing cavity 122 of the centrifugal pump 102 and the secondary containment area 162 of the intermediate drive 104. Likewise, the secondary static barrier 154, which may also be formed of a non-metallic material, may be positioned within the drive housing such that the secondary static barrier 154 provides a static seal of the secondary containment area 162 of the intermediate drive, such as between the central housing 160 and the output end housing 158 of the drive housing 150. Seals such as static elastomer seals 172 and/or sealing adhesives may provide static seals between components defining the volume of the secondary containment area 162. Accordingly, the secondary containment area 162 may be sealed completely with static seals and without any dynamic seals separating the secondary containment area 162 from the surrounding environment or from the primary containment area 128.

The first rotor 164 of the second magnetic drive 166 may include one or more magnet 174 (e.g., encapsulated magnets) at a location proximate to a first side of the secondary static barrier 154 positioned and configured to interact with one or more corresponding magnet 176 (e.g., encapsulated magnets) of a second rotor 178 of the second magnetic drive 166, the magnets 176 being located proximate to an opposing second side of the secondary static barrier 154.

The second rotor 178 may include a coupling 180 configured to couple the second rotor 178 to an output shaft 182 of the motor 108 (e.g., an electric motor). Additionally, the input end housing 158 may include a coupling 184 (e.g., a mounting flange) configured to couple to a housing 186 of the motor 108.

Although the first magnetic drive 144 and the second magnetic drive 166 are shown having nested annular portions, additional embodiments of the present disclosure may include alternative geometries and arrangements. For example, embodiments may include one or more magnetic drive having rotors with opposing planar faces with magnets that interact across a planar portion of a static barrier. Additionally, the arrangement of the magnetic drives may be reversed. For example, rather than the annular portion of the first rotor 164 being nested within the annular portion of the second rotor 178, the first rotor 164 may have an annular portion with a larger diameter than that of the second rotor 178 and the annular portion of the second rotor 178 may be nested within the annular portion of the first rotor 164 and the orientation of the secondary static barrier 154 may be flipped 180 degrees with respect to the drive housing 150.

The drive housing 150 may include one or more mounting bracket 188 configured to facilitate mounting of the intermediate drive 104 to a structure, and one or more hoisting ring 190 configured to facilitate hoisting of the intermediate drive 104 for installation and/or removal. The drive housing 150 may additionally include one or more ancillary connection port 192 that may be utilized to connect sensors (e.g., sensors to detect a leak from the primary containment area 128 to the secondary containment area 162), and/or other systems to the intermediate drive 104. An ancillary connection port 192 may be sealed with a plug if unused.

In operation, the motor 108 may impart a torque on the output shaft 182 of the motor and cause the output shaft 182 to rotate. As the second rotor 178 of the second magnetic drive 166 is coupled to the output shaft 182, the second rotor 178 may also be caused to rotate by the motor 108. The magnets 176 of the second rotor 178 may interact with the magnets 174 of the first rotor 164 via a magnetic field extending through the secondary static barrier 154, and when the second rotor 178 rotates a torque may be applied to the first rotor 164 via the magnetic field, which may cause the first rotor 164 to rotate.

As the first rotor 164 of the second magnetic drive 166 is mechanically coupled to the rotor 142 of the first magnetic drive 144 via the drive shaft 152, the rotation of the first rotor 164 of the second magnetic drive 166 may cause the rotor 142 of the first magnetic drive 144 to rotate. The magnets 140 of the rotor 142 may interact with the magnets 136 of the impeller 118 via a magnetic field extending through the primary static barrier 130, and when the rotor 142 rotates a torque may be applied to the impeller 118 via the magnetic field, which may cause the impeller 118 to rotate. The rotation of the impeller 118 may impart a centrifugal force to fluid in the housing cavity 122 of the centrifugal pump 102, which may cause fluid to be drawn into the centrifugal pump 102 via the fluid inlet 124 and to exit via the fluid outlet 126.

In some embodiments, because one or more of the primary static barrier 130 and the secondary static barrier 154 are made from a non-metallic material, the moving magnetic fields of the first magnetic drive 144 and the second magnetic drive 166, respectively, may not cause the induction of eddy currents in the primary static barrier 130 or the secondary static barrier 154, which may improve efficiency and reduce heat and stress.

Additionally, since the intermediate drive 104 includes a secondary containment area 162 that is completely statically sealed (e.g., completely statically sealed without any dynamic seals providing a barrier between the secondary containment area 162 and the surrounding environment or the primary containment area 128), a leak occurring from the primary containment area 128 into the secondary containment area 162, such as from a device failure, may be safely contained in the secondary containment area 162. The presence of fluid from the primary containment area 128 in the secondary containment area 162 may be detected by a sensor and alert an operator so that remedial action may be taken. Accordingly, a failure of a seal between the primary containment area 128 and the secondary containment area 162 may be remedied without the leakage of fluid from the primary containment area 128 into the surrounding environment.

Figure 2:
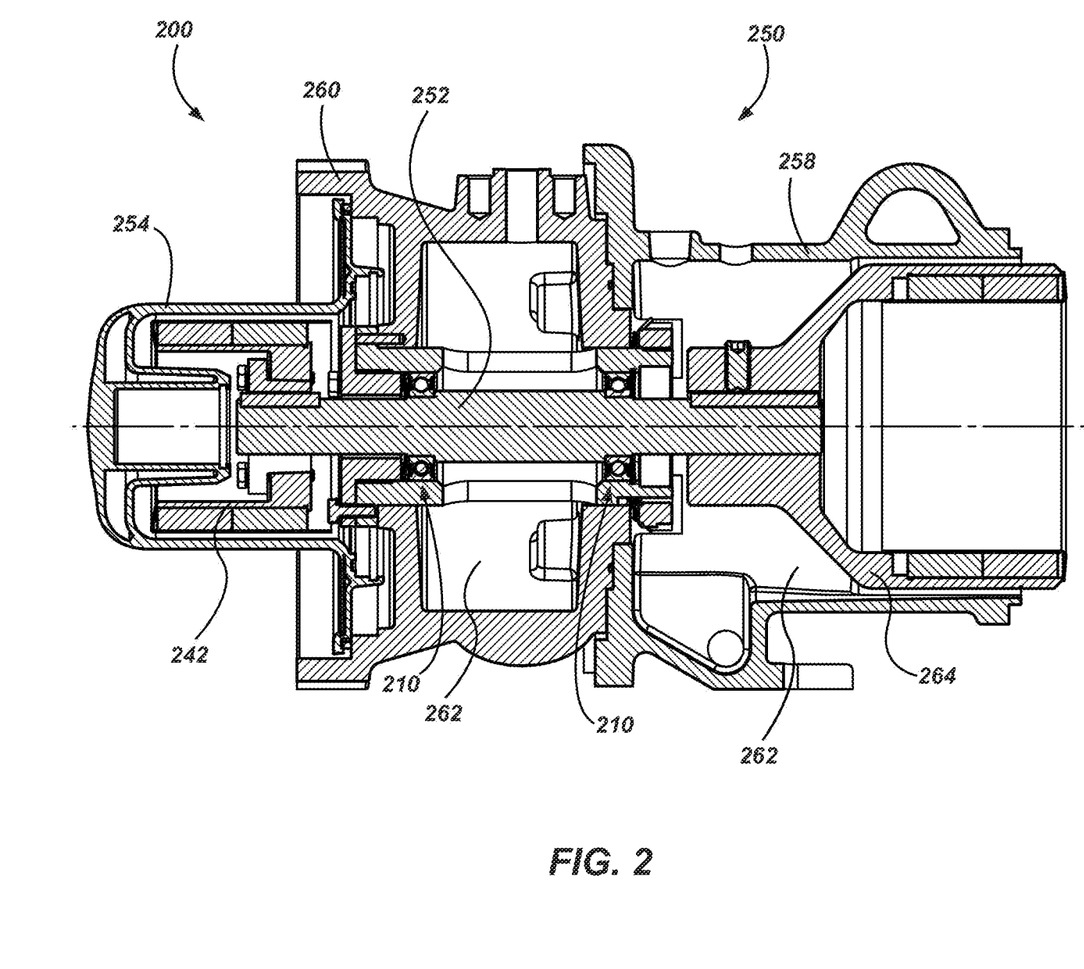
FIG. 2 is a cross-sectional view of a magnetically-driven intermediate drive with secondary containment having sealed bearings, according to an additional embodiment of the present disclosure.

FIG. 2 illustrates a cross-sectional view of a magnetically-driven intermediate drive 200 with secondary containment having sealed bearings 210, according to an additional embodiment of the present disclosure.

The intermediate drive 200 may be configured to connect to a mechanical device, such as a centrifugal pump substantially identical to the centrifugal pump 102 (see FIG. 1).

The intermediate drive 200 may include a drive housing 250, a drive shaft 252, and a static barrier 254 that may be formed of a non-metallic material. The housing of the intermediate drive 200 may be comprised of a plurality of sections including an output end housing 258, and a central housing 260 that may be cast, molded, or otherwise formed, and connected with fasteners and/or adhesives. The central housing 260 may be configured to connect to an input end housing substantially identical to the input end housing 156 (see FIG. 1). The output end housing 258 and the central housing 260 of the drive housing 250, may provide a barrier for a secondary containment area 262, and may be formed from a corrosion-resistant material (e.g., a stainless steel, a polymer, a reinforced polymer, a composite, a ceramic, and/or a reinforced ceramic) and/or may be lined with a corrosion-resistant material.

The drive shaft 252 may have an output end mechanically coupled with a rotor 242 of a first magnetic drive and an opposing input end mechanically coupled with a rotor 264 of a second magnetic drive. One or more radial bearing 210 may be positioned between the drive housing 250 and the drive shaft 252 to secure the drive shaft 252 and facilitate the rotation of the drive shaft 252 relative to the drive housing 250.

Each bearing 210 may be a sealed bearing such that grease may be sealed within each bearing 210 that lubricates each respective bearing 210 for the life of the bearing 210, eliminating the need for an oil bath and its subsystems.

When the output end housing 258 is coupled to a mechanical device (such as a centrifugal pump) a primary static barrier of the mechanical device may provide a static seal between mechanical device and the secondary containment area 262 of the intermediate drive 200. Likewise, a secondary static barrier 254, which may be formed of a non-metallic material, coupled to the drive housing 250 may provide a static seal of the secondary containment area 262 of the intermediate drive 200. Accordingly, the secondary containment area 262 may be sealed completely with static seals and without any dynamic seals separating the secondary containment area 262 from the surrounding environment or from a primary containment area.

Figure 3:
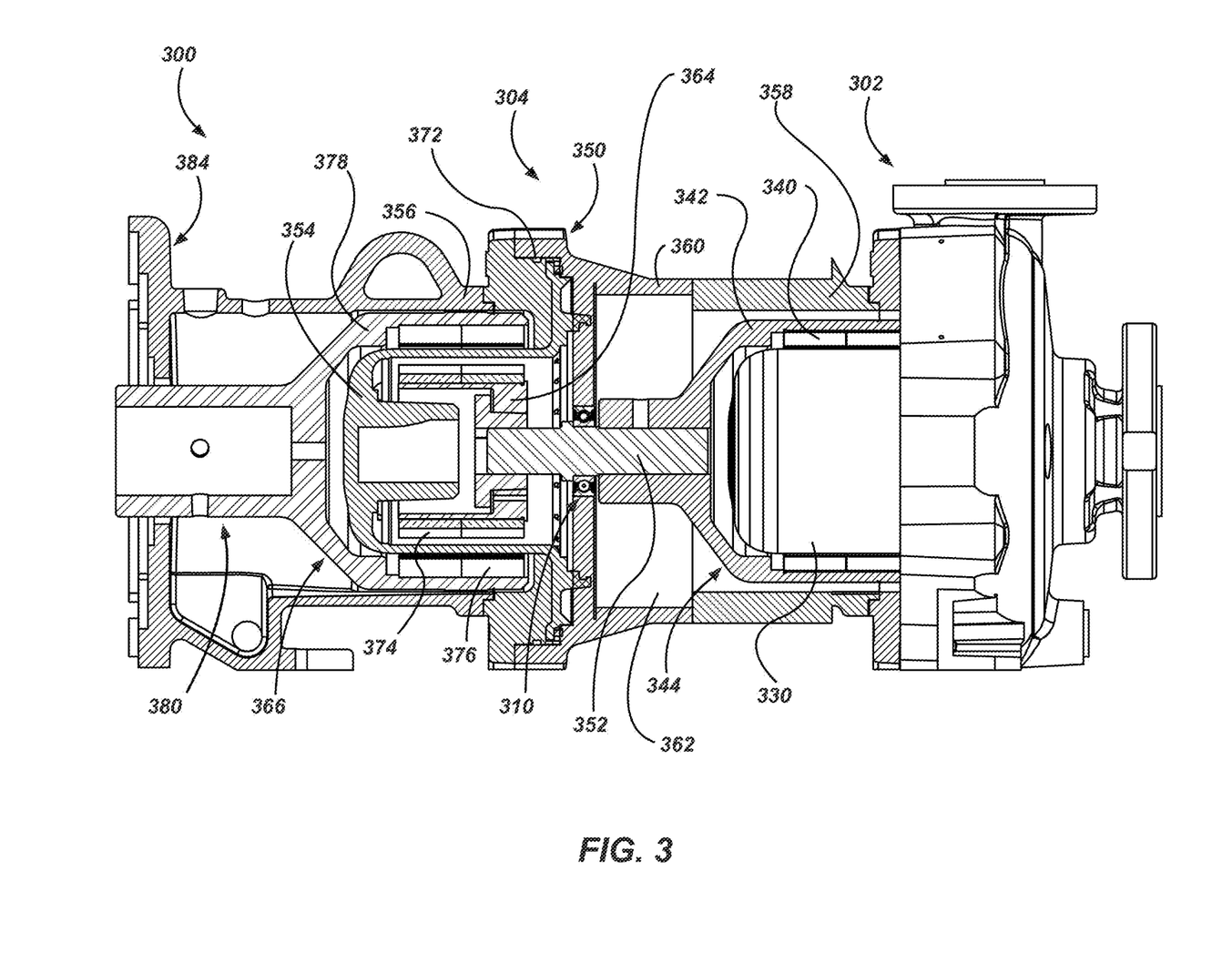
FIG. 3 illustrates a partial cross-sectional view of a centrifugal pump assembly with a magnetically-driven centrifugal pump and a magnetically-driven intermediate drive providing secondary containment having a single bearing, according to an additional embodiment of the present disclosure.

FIG. 3 illustrates a partial cross-sectional view of a centrifugal pump assembly 300 with a magnetically-driven centrifugal pump 302 and a magnetically-driven intermediate drive 304 providing secondary containment for the centrifugal pump 302 having a single bearing 310, according to an additional embodiment of the present disclosure.

The intermediate drive 304 may be configured to connect to a mechanical device, such as a centrifugal pump 302, which may be substantially identical to the centrifugal pump 102 described with reference to FIG. 1. The centrifugal pump 302 may include a primary static barrier 330, which may be formed of a non-metallic material, that provides a static seal of a primary containment area of the centrifugal pump 302.

The intermediate drive 304 may include a drive housing 350, a drive shaft 352, and a secondary static barrier 354. The drive housing 350 may be comprised of a plurality of sections including an input end housing 356, an output end housing 358, and a central housing 360 that may be cast, molded, or otherwise formed, and connected with fasteners and/or adhesives. At least the output end housing 358 and the central housing 360 of the drive housing 350, which provide a barrier for a secondary containment area 362, may be formed from a corrosion-resistant material (e.g., a stainless steel, a polymer, a reinforced polymer, a composite, a ceramic, and/or a reinforced ceramic), and/or may be lined with a corrosion-resistant material.

The drive shaft 352 may have an output end mechanically coupled with the rotor 342 of the first magnetic drive 344 and an opposing input end mechanically coupled with a first rotor 364 of a second magnetic drive 366. The rotor 342 may include magnets 340 that may be positioned proximate the primary static barrier 330 positioned and configured to interact with magnets of an impeller of the centrifugal pump 302.

The drive housing 350 and the drive shaft 352 may be relatively short, such as in comparison to the drive housing 150 and drive shaft 152 described with reference to FIG. 1. Accordingly, a single radial bearing 310 may be positioned between the drive housing 350 and the drive shaft 352 to secure the drive shaft 352 and facilitate the rotation of the drive shaft 352 relative to the drive housing 350. The bearing 310 may be a sealed bearing such that grease may be sealed within the bearing 310 that lubricates the bearing 310 for the life of the bearing 310. In some embodiments, the bearing 310 may be supported and positioned by a portion of the central housing 360 of the drive housing 350 (e.g., a laterally or radially extending structure of the central housing 360).

The output end housing 358 may be coupled to the centrifugal pump 302 such that the primary static barrier 330 provides a static seal between the primary containment area of the centrifugal pump 302 and the secondary containment area 362 of the intermediate drive 304. Likewise, a secondary static barrier 354, which may be formed of a non-metallic material, may be positioned within the drive housing 350 such that the secondary static barrier 354 provides a static seal of the secondary containment area 362 of the intermediate drive 304, such as between the central housing 360 and the output end housing 358 of the drive housing 350. Seals such as static elastomer seals 372 and/or sealing adhesives may provide static seals between components defining the volume of the secondary containment area 362. Accordingly, the secondary containment area 362 may be sealed completely with static seals and without any dynamic seals separating the secondary containment area 362 from the surrounding environment or from the primary containment area of the centrifugal pump 302 (e.g., provided, in part, with the primary static barrier 330).

The first rotor 364 of the second magnetic drive 366 may include magnets 374 at a location proximate to a first side of the secondary static barrier 354 positioned and configured to interact with corresponding magnets 378 of a second rotor 376 of the second magnetic drive 366, the magnets 374 being located proximate to an opposing second side of the secondary static barrier 354.

The second rotor 376 may include a coupling 380 configured to couple the second rotor 376 to an output shaft of a motor (e.g., an electric motor). Additionally, the input end housing 358 may include a coupling 384 (e.g., a mounting flange) configured to couple to a housing of a motor.

Figure 4:
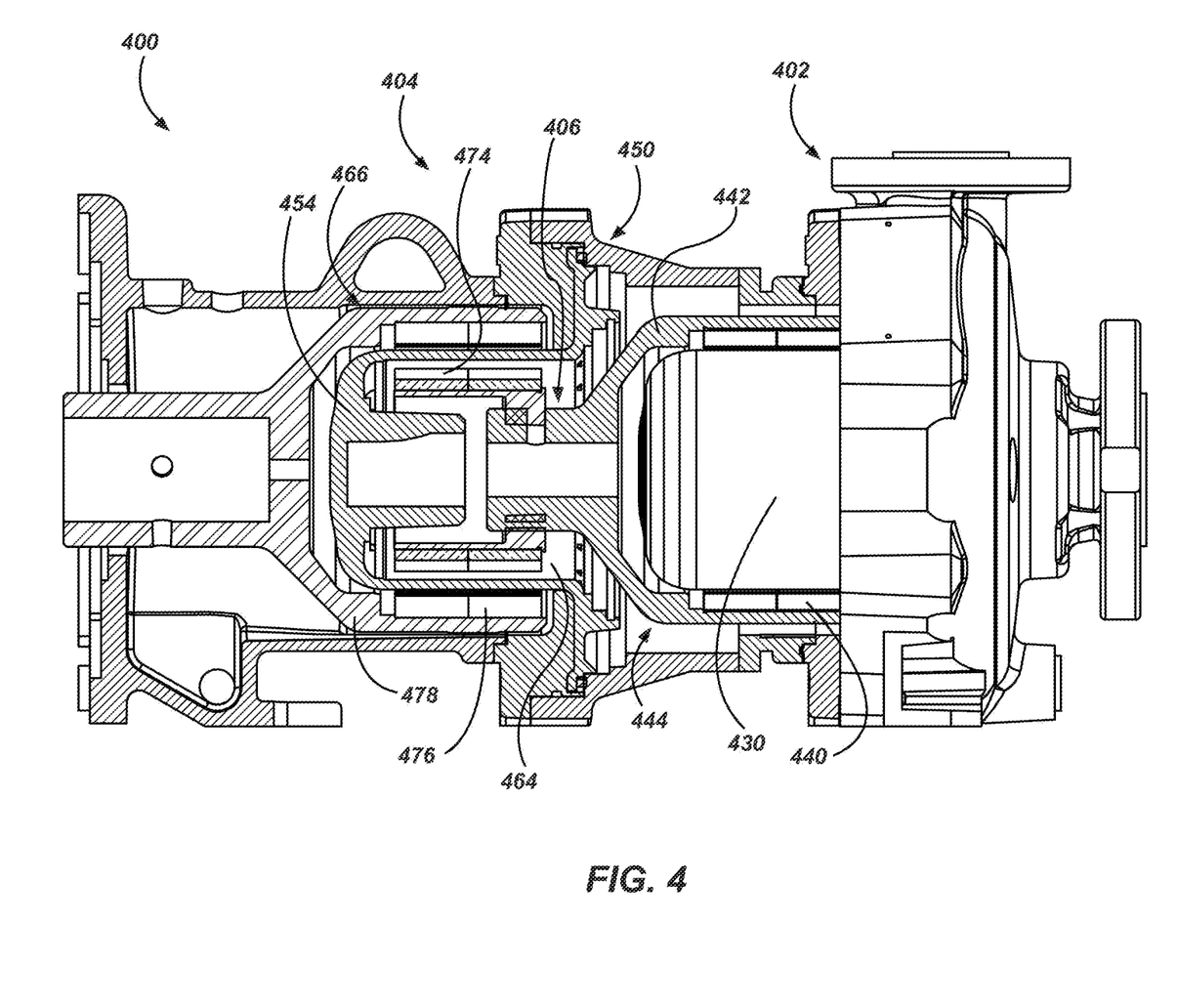
FIG. 4 illustrates a partial cross-sectional view of a centrifugal pump assembly with a magnetically-driven centrifugal pump and a magnetically-driven intermediate drive providing secondary containment having an intermediate rotor assembly that is not supported by any bearings, according to an additional embodiment of the present disclosure.

FIG. 4 illustrates a partial cross-sectional view of a centrifugal pump assembly 400 with a magnetically-driven centrifugal pump 402 and a magnetically-driven intermediate drive 404 providing secondary containment having an intermediate rotor or drive assembly 406 that is not supported by any bearings, according to an additional embodiment of the present disclosure.

The intermediate drive 404 may be configured to connect to a mechanical device, such as the centrifugal pump 402, which may be substantially identical to the centrifugal pump 102 described with reference to FIG. 1. The centrifugal pump 402 may include a primary static barrier 430, which may be formed of a non-metallic material, that provides a static seal of a primary containment area of the pump 402.

Similar to the intermediate drive 304, the intermediate drive 404 may include a drive housing 450 and a secondary static barrier 454. Rather than utilizing a drive shaft, however, a rotor 442 of a first magnetic drive 444 and a first rotor 464 of a second magnetic drive 466 may be mechanically coupled directly together without a drive shaft to form the intermediate rotor assembly 406. Accordingly, the intermediate drive 404 may be relatively compact and have relatively few moving parts.

The rotor 442 of the first magnetic drive 444 may include magnets 440 positioned to interact with magnets of a rotor of the centrifugal pump 402 across the primary static barrier 430. Likewise, the first rotor 464 of the second magnetic drive 466 may include magnets 474 that are positioned to interact with magnets 476 of a second rotor 478 of the second magnetic drive 466 across the secondary static barrier 454. The interaction of the magnets 440 and the magnets of the centrifugal pump of the first magnetic drive 444 and the interaction of the magnets 474 and 476 of the second magnetic drive 466 may be positioned and configured to create a magnetic field that levitates the intermediate rotor assembly 406 within the drive housing 450 (e.g., substantially centers or self-aligns the intermediate rotor assembly 406 about an axis of rotational and/or linear movement), such that no bearings are needed to secure the intermediate rotor assembly 406 within the intermediate drive 404.

Components of the intermediate drive 404, such the rotors 442 and 464 of the intermediate rotor assembly 406 may be injection molded. Injection molding may facilitate the molding of components around the magnets. Additionally, injection molding of components of the intermediate rotor assembly 406 may allow for the intermediate rotor assembly 406 to be lightweight and precisely balanced, which may be important since the intermediate rotor assembly 406 will be supported solely by the magnetic fields of the first magnetic drive 444 and the second magnetic drive 466.

The remaining components of the intermediate drive 404 may be substantially identical to those of the intermediate drive 304 described with reference to FIG. 3.

Accordingly, although embodiments of the present disclosure may be described herein with reference to pumps, such as centrifugal pumps, it will be understood that additional mechanical devices, such as stirrers, reactors, propulsion systems, compressors, and/or drive systems may be utilized in conjunction with intermediate drive assemblies with secondary containment according to additional embodiments of the present disclosure.

Additionally, although embodiments of the present disclosure may be described with reference to motors as an energy source, such as electric motors, it will be understood that additional energy sources, including rotational energy sources and linear energy sources may be utilized in additional embodiments of the present disclosure.

Further, while embodiments of the present disclosure may be described with reference to pumping and/or processing hazardous fluids, embodiments of the present disclosure may be utilized for any number of additional applications or fluid handling devices/systems, such as marine propulsion systems (e.g., for deep sea underwater manned vehicles where leak detection and secondary leak containment would be desired), outer space applications (e.g., where protection of human life from loss of internal atmospheric conditions would be critical), energy recovery pump applications, actuators, medical devices, and/or consumer products (e.g., aquarium pumps, mixers, etc.).

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure as contemplated by the inventor.

What is claimed is:

1. A pump assembly comprising:
    a pump comprising a pump housing, a housing cavity, a fluid inlet, and a fluid outlet, the pump defining a primary containment area;
    an intermediate drive positioned and configured to transmit energy from a motor to the pump, the intermediate drive defining a secondary containment area separate from the primary containment area, the intermediate drive comprising a modular drive housing including an output end housing and a central housing;
    a non-metallic first static barrier providing a static seal between the housing cavity of the pump and the secondary containment area, the first static barrier being positioned at least partially within the output end housing;
    a non-metallic second static barrier providing a static seal between the secondary containment area and a surrounding environment, the second static barrier extending at least partially from the central housing;
    a first magnetic drive for providing a magnetic coupling across the first static barrier;
    a second magnetic drive for providing a magnetic coupling across the second static barrier; and
    a drive shaft having an output end mechanically coupled to a rotor of the first magnetic drive and an opposing input end mechanically coupled to a rotor of the second magnetic drive, the drive shaft housed in the central housing with one or more radial bearings for supporting the drive shaft,
    wherein the central housing includes a modular cartridge positioned in the central housing, the modular housing configured to enable supply of lubricating fluid to the one or more radial bearings, and
    wherein the central housing and the drive shaft are configured to be removed from the intermediate drive such that the rotor of the first magnetic drive is directly coupled to the rotor of the second magnetic drive.

2. The pump assembly of claim 1, wherein at least one of the non-metallic first static barrier or the non-metallic second static barrier comprises at least one of a polymer, a reinforced polymer, a composite, a ceramic, or a reinforced ceramic.

3. The pump assembly of claim 1, wherein the modular cartridge is configured to enable supply of the lubricating fluid through openings formed in lateral or radial sides of the modular cartridge, the openings enabling communication between the modular cartridge and the central housing during use of the pump assembly.

4. The pump assembly of claim 1, wherein the central housing includes a removable, modular cartridge for supporting and positioning the one or more radial bearings and the drive shaft.

5. The pump assembly of claim 1, wherein each radial bearing of the one or more radial bearings is a sealed radial bearing.

6. The pump assembly of claim 1, wherein the drive shaft of the intermediate drive is supported by the one or more radial bearings comprising a single radial bearing, the single radial bearing supported and positioned by a portion of the central housing.

7. The pump assembly of claim 1, wherein one or more interior surfaces of the pump comprise a polymer coating.

8. The pump assembly of claim 1, wherein the rotor of the first magnetic drive is mechanically coupled to the rotor of the second magnetic drive to form an intermediate rotor assembly which is not supported by any bearings when the central housing is removed from the intermediate drive.

9. The pump assembly of claim 8, wherein the intermediate rotor assembly magnetically levitates.

10. The pump assembly of claim 1, wherein a portion of a housing of the intermediate drive that provides a barrier for the secondary containment area is formed from a corrosion-resistant material.

11. A method of driving a fluid handling device with the intermediate drive of claim 1 including the secondary containment area, the method comprising:
    indirectly driving the rotor of the first magnetic drive via magnetic force applied through the non-metallic first static barrier;
    transferring force applied to the rotor of the first magnetic drive to a second rotor; and
    indirectly driving the fluid handling device with the rotor of the second magnetic drive via magnetic force applied through the non-metallic second static barrier.

12. The pump assembly of claim 1, wherein the modular drive housing further comprises a drive input end housing coupled to a portion of the pump.

13. A pump assembly comprising:
a pump comprising a pump housing, a housing cavity, a fluid inlet, and a fluid outlet, the pump defining a primary containment area;
an intermediate drive positioned and configured to transmit energy from a motor to the pump, the intermediate drive defining a secondary containment area separate from the primary containment area, the intermediate drive comprising a modular drive housing including an output end housing and a central housing;
a non-metallic first static barrier providing a static seal between the housing cavity of the pump and the secondary containment area, the first static barrier being positioned at least partially within the output end housing;
a non-metallic second static barrier providing a static seal between the secondary containment area and a surrounding environment;
a first magnetic drive for providing a magnetic coupling across the first static barrier;
a second magnetic drive for providing a magnetic coupling across the second static barrier; and
a drive shaft having an output end mechanically coupled to a rotor of the first magnetic drive and an opposing input end mechanically coupled to a rotor of the second magnetic drive, the drive shaft housed in the central housing, wherein the central housing is configured to be removed from the intermediate drive such that the intermediate drive lacks one or more bearings housed in the central housing.

14. The pump assembly of claim 13, wherein the intermediate drive lacks the drive shaft when the central housing is removed from the intermediate drive.

15. The pump assembly of claim 13, wherein the intermediate drive comprises the drive shaft supported by the one or more bearings comprising a single radial bearing.

16. The pump assembly of claim 13, wherein the modular drive housing further comprises a drive input end housing coupled to a portion of the pump.

17. The pump assembly of claim 13, wherein the rotor of the first magnetic drive is configured to be directly coupled to the rotor of the second magnetic drive when the central housing is removed from the intermediate drive.

18. A pump assembly comprising:
a pump comprising a pump housing, a housing cavity, a fluid inlet, and a fluid outlet, the pump defining a primary containment area; and
an intermediate drive comprising:
a modular housing including a drive end housing, an output end housing, and a central housing, the output end housing coupled to the pump and the drive end housing configured to couple to a motor;
a static barrier coupled to the drive end housing and defining a containment area within the modular housing that is sealed with one or more static seals separating the containment area from a surrounding environment;
a rotor comprising magnets positioned adjacent to the static barrier of the intermediate drive to be driven by the motor;
a drive coupling mechanically coupled to the rotor, the drive coupling configured to apply force supplied by the motor via the intermediate drive to the pump;
a drive shaft coupled between the rotor and the drive coupling; and
a cartridge positioned in the central housing for supporting and positioning the drive shaft in the modular housing with one or more bearings, at least one of the central housing, the cartridge, the drive shaft, or the one or more bearings configured to be removed from the modular housing in order to reconfigure the intermediate drive for use with multiple pumps and/or motors, wherein the modular housing and the cartridge are configured to enable supply of lubricating fluid to the one or more bearings.

19. A pump assembly comprising:
a pump comprising a pump housing, a housing cavity, a fluid inlet, and a fluid outlet, the pump defining a primary containment area; and
an intermediate drive comprising:
a drive housing having a first end configured to couple to a fluid handling device and a second end configured to couple to a motor;
a static barrier coupled to the drive housing and defining a containment area within the drive housing that is sealed with one or more static seals separating the containment area from a surrounding environment when the drive housing is coupled to a fluid handling device; and
a drive assembly comprising:
a rotor comprising magnets positioned adjacent to the static barrier of the intermediate drive to be driven by the motor; and
a drive coupling coupled to the rotor, the drive coupling configured to apply force supplied by the motor via the intermediate drive to the pump, wherein the intermediate drive is modular such that, in a first configuration, the intermediate drive is configured to support the drive assembly using only a single bearing and, in a second configuration, the intermediate drive is configured to support the drive assembly without use of bearings.

* * * * *